Figure 1:
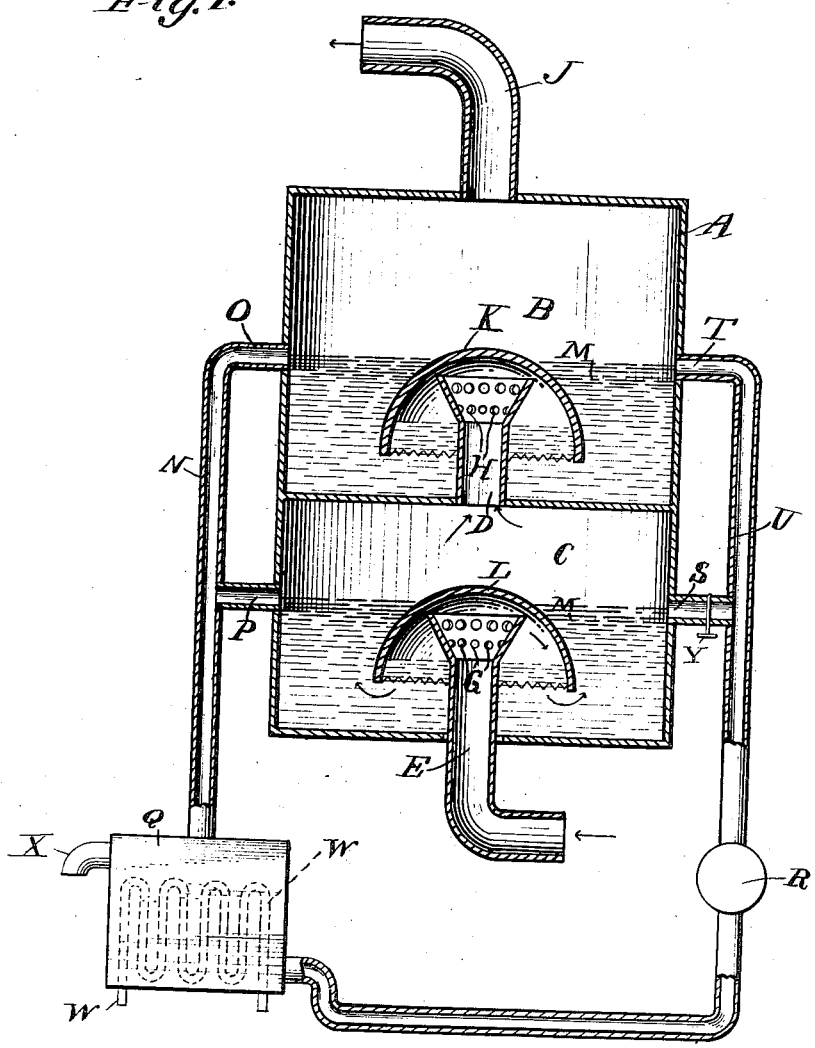

No. 847,273. PATENTED MAR. 12, 1907.
N. T. BACON.
PROCESS OF DRYING AIR FOR BLAST FURNACES.
APPLICATION FILED MAR. 13, 1906.

Attest:

Inventor:
Nathaniel Terry Bacon.
by Dickerson, Brown,
Raegener & Binney, Attys.

UNITED STATES PATENT OFFICE.

NATHANIEL TERRY BACON, OF PEACE DALE, RHODE ISLAND.

PROCESS OF DRYING AIR FOR BLAST-FURNACES.

No. 847,273.            Specification of Letters Patent.            Patented March 12, 1907.

Original application filed January 25, 1905, Serial No. 242,697. Divided and this application filed March 13, 1906. Serial No. 305,777.

*To all whom it may concern:*

Be it known that I, NATHANIEL TERRY BACON, residence and post-office address Peace Dale, Rhode Island, have invented certain new and useful Improvements in Processes for Drying Air or other Gases for Blast-Furnaces and other Uses, of which the following is a specification.

A process has recently been discovered and gone into use by which the air or gas for blast-furnaces, whether preheated or not, has been dried, thereby effecting a marked increase of heat economy in the combustion process or other process for which said gas or air is used.

The present process consists in an improved way of drying the air or other gas simply and advantageously. This object I accomplish, preferably, by washing the air or other gas with or exposing it to a substance, preferably liquid, at abnormally low temperature as compared with the source of air or gas supply. This may be best exemplified by the use of mercury, one of the characteristics of which is that water will not mix with it. The air or gas to be dried may be bubbled through mercury at a temperature low enough to freeze the moisture and the frozen moisture floating on the surface of the mercury may be carried off either with the mercury or by scraping it from the surface. In either event it is the liquid state of the mercury that makes the ready removal of the abstracted moisture possible. If mercury be used and the moisture frozen, the latent heat of liquefaction which has passed into the mercury may be to a large extent abstracted therefrom by causing the ice to melt chemically, as by the use of salt, and thereby again reducing the temperature of the mercury. For some purposes it will also be advantageous to initially chill the entering fresh air by means of the chilled and dried air leaving the cooling apparatus proper.

In the drawing suitable apparatus is shown diagrammatically, carrying out the invention.

A represents a mercury-tower, which is in this instance divided into two compartments B and C, each of which is partially filled with mercury M. Each compartment is provided with gas-inlet pipes D and E, which are suitably shaped at the top and provided with holes G and H. Hoods or caps K and L are preferably placed over the tops of the gas-inlets D and E for the purpose of compelling the gas to bubble through the mercury M. The gas under pressure enters the pipe E and after passing through the holes G and underneath the edge of the hood L passes through the mercury M into the chamber C. From the chamber C the gas passes in the same manner through the pipe D and through the mercury into the compartment B and from there out through the pipe J. A suitable system of circulation is provided, which consists of the pipe N, which has the two inlets O and P, one in each compartment, to permit the ice-water and mercury to run into the overflow-tank Q, where the mercury may be chilled by any suitable means, such as passing a liquid chilled by any suitable ice machine (not shown) through the coil of pipe W. A suitable outlet X is provided at the top of the tank Q to permit the ice or water to flow off from the surface of the mercury in the tank. From the tank Q the mercury can be pumped back into the system by means of the pump R. The pump R is connected to the two compartments at S and T by means of the pipe U. In order to pump mercury to either chamber, a valve Y is provided in the pipe S, so that the same may be closed to pump mercury into the tank B.

What I claim as my invention is—

1. In the process of drying air or other gases for blast-furnaces and other uses, the improvement which consists in extracting the moisture from air or gas by lowering its temperature below the freezing-point by exposing it to a liquid chilled to a suitable temperature and with which water does not mix, and extracting the condensed moisture during the continuation of the process.

2. In the process of drying air or other gases for blast-furnaces and other uses, the improvement which consists in extracting the moisture from the air or gas by lowering its temperature below the freezing-point by exposing it to a liquid chilled to a suitable temperature with which water does not mix, causing the air to be chilled to mingle with the ice and chilled liquid so as to cause a preliminary cooling of the air to be chilled by melting the ice resulting from the chilling, and extracting the moisture wholly or partly in liquid form without interruption of the process.

3. In the process of drying air or other gases for blast-furnaces and other uses, the improvement which consists in extracting the moisture from the air or gas supplied by lowering its temperature by exposing it to a relatively cold liquid, with which water does not mix, and extracting the condensed moisture during the continuation of the process.

4. In the process of drying air or other gases for blast-furnaces and other uses, the improvement which consists in extracting the moisture from the air or gas supplied by lowering its temperature by exposing it to chilled mercury, and extracting the condensed moisture during the continuation of the process.

In testimony whereof I have signed this specification in the presence of two subscribing witnesses.

NATHANIEL TERRY BACON.

Witnesses:
J. R. CARPENTER,
WILLIAM T. STEDMAN.